(12) United States Patent
Kunieda (10) Patent No.: US 7,651,754 B2
(45) Date of Patent: Jan. 26, 2010

(54) HONEYCOMB STRUCTURE

(75) Inventor: Masafumi Kunieda, Gifu (JP)

(73) Assignee: Ibiden Co., Ltd., Gifu (JP)

( * ) Notice: Subject to any disclaimer, the term of this patent is extended or adjusted under 35 U.S.C. 154(b) by 156 days.

(21) Appl. No.: 11/342,636

(22) Filed: Jan. 31, 2006

(65) Prior Publication Data

US 2006/0172113 A1    Aug. 3, 2006

(30) Foreign Application Priority Data

Feb. 1, 2005    (JP)    ............................ 2005-025406
Dec. 8, 2005    (WO)    ................. PCT/JP2005/022589

(51) Int. Cl.
     *B32B 3/12*    (2006.01)
     *B01D 59/50*    (2006.01)
     *B01D 39/06*    (2006.01)

(52) U.S. Cl. ...................... 428/116; 428/117; 428/119; 55/523; 55/482

(58) Field of Classification Search ................ 428/116, 428/117, 119, 188, 913, 327, 73, 307.3, 34.4, 428/177, 304.4, 192; 501/118, 119, 120, 501/153, 154; 502/180, 178, 527.16, 527.17, 502/527.15; 264/177.12; 55/523, 483, 502, 55/529; 156/60, 89.11

See application file for complete search history.

(56) References Cited

U.S. PATENT DOCUMENTS

| | | | |
|---|---|---|---|
| 4,808,460 A | 2/1989 | Chyung et al. | |
| 5,316,710 A | 5/1994 | Tasaki et al. | |
| 6,365,259 B1 | 4/2002 | Brundage et al. | |
| 7,182,999 B2* | 2/2007 | Ohashi et al. | ............ 428/292.1 |
| 7,316,722 B2 | 1/2008 | Komori et al. | |
| 2004/0093858 A1 | 5/2004 | Aoki | |
| 2004/0118095 A1 | 6/2004 | Chikawa et al. | |
| 2005/0016141 A1* | 1/2005 | Hong et al. | .................... 55/523 |
| 2005/0102984 A1 | 5/2005 | Bardon et al. | |
| 2005/0102987 A1 | 5/2005 | Kudo | |
| 2005/0227869 A1 | 10/2005 | Ohno et al. | |
| 2005/0266992 A1 | 12/2005 | Ohno et al. | |
| 2006/0177629 A1 | 8/2006 | Kunieda | |
| 2006/0292044 A1 | 12/2006 | Ohno et al. | |

(Continued)

FOREIGN PATENT DOCUMENTS

DE      43 41 159 A1    6/1995

(Continued)

OTHER PUBLICATIONS

European Patent Office Action, issued by European Patent Office Action in counterpart European Application No. 06001438.8.

(Continued)

*Primary Examiner*—Timothy M Speer
*Assistant Examiner*—Gordon R Baldwin
(74) *Attorney, Agent, or Firm*—Finnegan, Henderson, Farabow, Garrett & Dunner LLP (57) ABSTRACT

A honeycomb structure is disclosed in which plural honeycomb units are adhered through the intermediary of an adhesive layer and in the honeycomb unit plural cells are juxtaposed to each other in the longitudinal direction thereof through the intermediary of a cell wall, characterized in that a ratio of a specific surface area of the honeycomb unit to that of the adhesive layer is approximately 1.0 or greater.

8 Claims, 6 Drawing Sheets

U.S. PATENT DOCUMENTS

| | | |
|---|---|---|
| 2006/0292330 A1 | 12/2006 | Ohno et al. |
| 2006/0292331 A1 | 12/2006 | Ohno et al. |
| 2006/0292332 A1 | 12/2006 | Ohno et al. |
| 2006/0292333 A1 | 12/2006 | Ohno et al. |
| 2006/0292334 A1 | 12/2006 | Ohno et al. |
| 2006/0292335 A1 | 12/2006 | Ohno et al. |
| 2006/0292336 A1 | 12/2006 | Ohno et al. |
| 2006/0292337 A1 | 12/2006 | Ohno et al. |
| 2006/0292338 A1 | 12/2006 | Ohno et al. |
| 2006/0292339 A1 | 12/2006 | Ohno et al. |
| 2006/0292340 A1 | 12/2006 | Ohno et al. |
| 2006/0292341 A1 | 12/2006 | Ohno et al. |
| 2006/0292342 A1 | 12/2006 | Ohno et al. |
| 2007/0004592 A1 | 1/2007 | Ohno et al. |
| 2007/0004593 A1 | 1/2007 | Ohno et al. |
| 2007/0077190 A1 | 4/2007 | Ohno |
| 2008/0118701 A1 | 5/2008 | Ohno et al. |
| 2008/0119355 A1 | 5/2008 | Ohno et al. |
| 2008/0176028 A1 | 7/2008 | Ohno et al. |
| 2008/0187713 A1 | 8/2008 | Ohno et al. |
| 2008/0241003 A1 | 10/2008 | Ido et al. |
| 2008/0241005 A1 | 10/2008 | Ido et al. |
| 2008/0241008 A1 | 10/2008 | Ido et al. |
| 2008/0260991 A1 | 10/2008 | Konstandapoulos et al. |
| 2009/0095416 A1 | 4/2009 | Kunseda et al. |

FOREIGN PATENT DOCUMENTS

| | | |
|---|---|---|
| EP | 0 816 065 | 1/1998 |
| EP | 1 447 535 | 8/2004 |
| EP | 1 452 511 | 9/2004 |
| EP | 1 479 881 | 11/2004 |
| EP | 1 489 277 A1 | 12/2004 |
| EP | 1489277 * | 12/2004 |
| EP | 1 493 479 | 1/2005 |
| EP | 1 495 791 A1 | 1/2005 |
| EP | 1 698 604 | 9/2006 |
| JP | 05-213681 | 8/1993 |
| JP | 10-263416 | 10/1998 |
| JP | 2000-102709 | 4/2000 |
| JP | 2000 279 729 | 10/2000 |
| JP | 2002-161726 | 6/2002 |
| JP | 2003-128473 | 5/2003 |
| JP | 2003-245547 | 9/2003 |
| JP | 2004-154718 | 6/2004 |
| JP | 2004-322095 | 11/2004 |
| WO | WO-03/053542 A1 | 7/2003 |
| WO | WO 03/067041 A1 | 8/2003 |
| WO | WO-03/078026 A1 | 9/2003 |
| WO | WO 03/081001 A1 | 10/2003 |
| WO | WO 03/086579 A1 | 10/2003 |
| WO | WO 2004/024295 A1 | 3/2004 |
| WO | WO-2004/031100 A1 | 4/2004 |
| WO | PCT/JP2005/021193 | 11/2005 |
| WO | WO 2006/040874 A1 | 4/2006 |

OTHER PUBLICATIONS

U.S. Appl. No. 11/414,361, Unpublished.
U.S. Appl. No. 11/173,056.
U.S. Appl. No. 11/094,180.
U.S. Appl. No. 11/925,394.
U.S. Appl. No. 11/853,658.
U.S. Appl. No. 11/928,546.
U.S. Appl. No. 12/238,057.
U.S. Appl. No. 12/245,821.
U.S. Appl. No. 12/246,899.
U.S. Appl. No. 12/246,881.
U.S. Appl. No. 12/239,342.
U.S. Appl. No. 12/246,913.
U.S. Appl. No. 12/246,869.
U.S. Appl. No. 12/248,647.
U.S. Appl. No. 12/248,675.
U.S. Appl. No. 12/379,768.
U.S. Appl. No. 12/516,813.
U.S. Appl. No. 12/407,645.
U.S. Appl. No. 12/248,625.
U.S. Appl. No. 12/271,216.
U.S. Appl. No. 12/368,514.
U.S. Appl. No. 12/246,628.
U.S. Appl. No. 12/346,610.
U.S. Appl. No. 12/367,780.
U.S. Appl. No. 12/389,338.
U.S. Appl. No. 12/358,937.
U.S. Appl. No. 12/389,343.
U.S. Appl. No. 12/359,957.
U.S. Appl. No. 12/343,965.
U.S. Appl. No. 12/359,969.
U.S. Appl. No. 12/369,347.
U.S. Appl. No. 12/372,192.
U.S. Appl. No. 12/372,229.
U.S. Appl. No. 12/368,551.
U.S. Appl. No. 12/362,310.
U.S. Appl. No. 12/355,999.
U.S. Appl. No. 12/355,990.
Japanese Industrial Standard JIS B 0601:2001 (ISO 4287: 1997), "Geometrical Product Specifications (GPS)-Surface texture: Profile method-Terms, definitions and surface texture parameters", p. 1-26 (Translated and Published by Japanese Standards Association).
Japanese Industrial Standard JIS R 1626-1996, "Measuring methods for the specific surface area of fine ceramic powders by gas adsorption using the BET method," UDC 666.5:539.215:531.72, p. 1-17 (Translated and Published by Japanese Standards Association).

* cited by examiner

HONEYCOMB STRUCTURE

BACKGROUND OF THE INVENTION

1. Field of the Invention

The present invention relates to a honeycomb structure.

2. Description of the Related Art

Conventionally, a catalyst for converting exhaust gas from an internal combustion engine has been manufactured by carrying a high specific surface area material such as activated alumina and a catalytic metal including a metal such as platinum as a component thereof on the surface of a catalyst carrier having a cordierite-based honeycomb unit.

For example, a catalyst for converting exhaust gas that includes a honeycomb-shaped carrier substrate, a catalyst carrying layer formed on the surface of a cell wall of the carrier substrate, and a catalytic noble metal and a NOx occluding material carried on the catalyst carrying layer, characterized in that the catalyst carrying layer is provided such that a portion existing in a range from the surface thereof to a depth of 100 μm occupies 80% or greater of the total volume of the catalyst carrying layer, is disclosed in JP-A-10-263416.

Also, a method for manufacturing a honeycomb-shaped fiber reinforced ceramic object characterized by extrusion-molding a composition containing ceramic powder, an inorganic fiber, an inorganic material with a binding property, and, if necessary, an organic binder having plasticity, into a honeycomb shape, then drying the extrusion-molded object, and subsequently firing it at a temperature equal to or less than the melting point or oxidation point of the inorganic fiber, is disclosed in JP-A-5-213681.

Further, a honeycomb catalyst for processing exhaust gas containing CO at a low concentration, in which a catalyst component containing a noble metal is carried on a porous honeycomb carrier provided by extrusion-molding and firing its material, wherein the thickness of an inner wall of the honeycomb catalyst is 0.1 through 0.5 mm and the length of it along the direction of gas flow is 50 through 200 mm, is disclosed in JP-A-2003-245547.

Additionally, the entire contents of JP-A-10-263416, JP-A-5-213681, and JP-A-2003-245547 are hereby incorporated by reference.

SUMMARY OF THE INVENTION

According to one aspect of the present invention, a honeycomb structure is provided in which plural honeycomb units are adhered through the intermediary of an adhesive layer and in the honeycomb unit plural cells are juxtaposed to each other in the longitudinal direction thereof through the intermediary of a cell wall, wherein a ratio of a specific surface area of the honeycomb unit to that of the adhesive layer is approximately 1.0 or greater.

In the honeycomb structure as described above, preferably, the specific surface area of the adhesive layer is approximately 10 $m^2/g$ or greater and approximately 100 $m^2/g$ or less.

In the honeycomb structure as described above, preferably, the adhesive layer contains at least one of an inorganic particle and an inorganic fiber.

The honeycomb structure as described above, preferably, includes a coating layer for coating at least one peripheral portion of at least one of the plural honeycomb units, wherein a ratio of a specific surface area of the honeycomb unit to that of the coating layer is approximately 1.0 or greater.

In the honeycomb structure as described above, preferably, the honeycomb unit contains a ceramic.

In the honeycomb structure as described above, preferably, the ceramic comprises alumina.

In the honeycomb structure as described above, preferably, the ceramic comprises silicon carbide.

The honeycomb structure as described above, preferably, carries a catalyst.

DETAILED DESCRIPTION OF THE PREFERRED EMBODIMENTS

A description will hereinafter be given of embodiments of the present invention, by referring to the drawings.

The first embodiment of the present invention is a honeycomb structure that includes plural honeycomb units and at least one of an adhesive layer and coating layer for arranging the plural honeycomb units, wherein the ratio of the specific surface area of the honeycomb unit to the specific surface area of at least one of the adhesive layer and coating layer is approximately 1.0 or greater.

The shape of the honeycomb structure in the first embodiment of the present invention is not particularly limited and may be, for example, a cylinder, a rectangular pillar, or a cylindroid.

The shape of each honeycomb unit constituting the honeycomb structure is not particularly limited, but is, preferably, a shape which can easily arrange the plural honeycomb units to each other. For example, the shape of a cross section of the honeycomb unit that is orthogonal to the longitudinal direction of the honeycomb unit is desirably a square, a rectangle, or a hexagon, and may be a fan-like form. Additionally, the honeycomb unit includes plural cells constituting the honeycomb unit and the cell of the honeycomb unit is a region separated by a cell wall of the honeycomb unit. The cell wall of the honeycomb unit may be able to be penetrated by gas. Also, the cell of the honeycomb unit has openings at both ends thereof in the longitudinal direction and one of the openings may be sealed according to need.

The cross-sectional area of the honeycomb unit that is orthogonal to the longitudinal direction of the honeycomb unit is preferably approximately 5 $cm^2$ or greater and approximately 50 $cm^2$ or less, more preferably, approximately 6 $cm^2$ or greater and approximately 40 $cm^2$ or less, most preferably approximately 8 $cm^2$ or greater and approximately 30 $cm^2$ or less. If the cross-sectional area of the honeycomb unit that is orthogonal to the longitudinal direction of the honeycomb unit is less than approximately 5 $cm^2$, pressure loss in the honeycomb structure may become larger when gas is passed through the honeycomb structure. On the other hand, if the cross-sectional area of the honeycomb unit that is orthogonal to the longitudinal direction of the honeycomb unit is greater than approximately 50 cm², thermal stress generated in the honeycomb structure may not be sufficiently dispersed when the temperature of the honeycomb structure is raised and a crack may easily generate in the honeycomb structure at the time of generation of the thermal stress. When the cross-sectional area of the honeycomb unit that is orthogonal to the longitudinal direction of the honeycomb unit is preferably approximately 5 cm² or greater and approximately 50 cm² or less, the pressure loss in the honeycomb structure can be suppressed and the generation of a crack in the honeycomb structure can be reduced.

In the first embodiment of the present invention, preferably, the honeycomb structure includes an adhesive layer for adhering the plural honeycomb units. Commonly, the adhesive layer is provided among the plural honeycomb units, contacts the honeycomb units that are adjacent to each other, and adheres the honeycomb units that are adjacent to each other in order to arrange the plural honeycomb units. The adhesive layer can improve the spalling resistance of the honeycomb structure by adhering the plural honeycomb units.

Additionally, the thickness of the adhesive layer is preferably approximately 0.5 mm or greater and approximately 2 mm or less. If the thickness of the adhesive layer is approximately 0.5 mm or greater, it may be easy to uniformly the adhesive layer on the honeycomb unit and local dispersion in the adhesive strength of the adhesive layer may be difficult to cause. Also, if the thickness of the adhesive layer is approximately 2 mm or less, a crack may be difficult to generate in the adhesive layer due to the thermal stress generated in the adhesive layer.

In the first embodiment of the present invention, preferably, the honeycomb structure includes a coating layer for coating at least one peripheral portion in at least one of the plural honeycomb units. Commonly, the coating layer coats peripheral portions of the plural honeycomb units positioned near the peripheral portion of the honeycomb structure. The coating layer can retain the form of the honeycomb structure and improve the strength of the honeycomb structure by coating at least one peripheral portion in at least one of the plural honeycomb units.

Additionally, the thickness of the coating layer is preferably approximately 0.1 mm or greater and approximately 2 mm or less. If the thickness of the coating layer is approximately 0.1 mm or greater, it may be easy to protect the plural honeycomb units and improve the strength of the honeycomb structure. Also, if the thickness of the coating layer is approximately 2 mm or less, a crack may be difficult to generate in the coating layer due to the thermal stress generated in the coating layer.

Also, the honeycomb structure may include both the adhesive layer and the coating layer. The material of the adhesive layer and the material of the coating layer may be identical to or different from each other.

In the first embodiment of the present invention, the specific surface area of the honeycomb unit is the total of surface area(s) of the honeycomb unit(s) per a unit mass or a unit weight of the honeycomb unit(s). Also, the specific surface area of the adhesive layer is the total of surface area(s) of the adhesive layer(s) per a unit mass or a unit weight of the adhesive layer(s) and the specific surface area of the coating layer is the total of surface area(s) of the coating layer(s) per a unit mass or a unit weight of the coating layer(s).

In the first embodiment of the present invention, the ratio of the specific surface area of the honeycomb unit to the specific surface area of at least one of the adhesive layer and the coating layer is approximately 1.0 or greater. Herein, "the ratio of the specific surface area of the honeycomb unit to the specific surface area of at least one of the adhesive layer and the coating layer being approximately 1.0 or greater" means that the ratio of the specific surface area of the honeycomb unit to the specific surface area of at least one of the adhesive layer and the coating layer is approximately 1.0 or greater on two significant digits.

When the honeycomb structure includes the adhesive layer, the ratio of the specific surface area of the honeycomb unit to the specific surface area of the adhesive layer is approximately 1.0 or greater, and, on the other hand, when the honeycomb structure includes the coating layer, the ratio of the specific surface area of the honeycomb unit to the specific surface area of the coating layer is approximately 1.0 or greater. Also, when the honeycomb structure includes both the adhesive layer and the coating layer, the ratio of the specific surface area of the honeycomb unit to the specific surface area of at least one of the adhesive layer and the coating layer is approximately 1.0 or greater. However, preferably, the ratio of the specific surface area of the honeycomb unit to the specific surface area of the adhesive layer is approximately 1.0 or greater and the ratio of the specific surface area of the honeycomb unit to the specific surface area of the coating layer is approximately 1.0 or greater.

In the first embodiment of the present invention, gas can be selectively passed through the honeycomb unit more preferentially than through at least one of the adhesive layer and the coating layer, since the ratio of the specific surface area of the honeycomb unit to the specific surface area of at least one of the adhesive layer and the coating layer is approximately 1.0 or greater. Accordingly, a light-off temperature that is one parameter representing the performance of converting gas can be lowered. Herein, as the proportion of reduction in the concentration of a particular component(s) (generally, a HC (hydrocarbon), CO) contained in gas which reduction is caused by reaction of converting the gas in the honeycomb unit is defined as a converting rate, the light-off temperature is a reaction temperature at which the converting rate is approximately 50%. When the light-off temperature of the honeycomb structure is low, gas can be converted with small amount of energy and, therefore, the gas conversion performance of the honeycomb structure will be high. Generally, when the light-off temperature of the honeycomb structure is approximately 160° C. through approximately 170° C. or less, the gas conversion performance of the honeycomb structure is well. In the first embodiment of the present invention, a honeycomb structure with a light-off temperature of approximately 160° C. or less can be provided since the ratio of the specific surface area of the honeycomb unit to the specific surface area of at least one of the adhesive layer and the coating layer is approximately 1.0 or greater.

Therefore, according to the first embodiment of the present invention, a honeycomb structure can be provided which can convert gas more efficiently.

Further, when the ratio of the specific surface area of the honeycomb unit to the specific surface area of both the adhesive layer and the coating layer is approximately 1.0 or greater, gas is more difficult to pass through both the adhesive layer and the coating layer than the honeycomb unit, and the reaction of converting the gas may be able to be sufficiently accelerated in the honeycomb unit. Thus, the gas conversion performance of the honeycomb unit may not be lowered.

In the first embodiment of the present invention, when the honeycomb structure includes the adhesive layer, the ratio of the specific surface area of the honeycomb unit to the specific surface area of the adhesive layer is preferably approximately 1.1 or greater and approximately 10 or less. When the ratio of the specific surface area of the honeycomb unit to the specific surface area of the adhesive layer is approximately 1.1 or greater and approximately 10 or less, a honeycomb structure with a light-off temperature of approximately 130° C. or less can be provided. That is, a honeycomb structure can be provided which can convert gas more efficiently.

In the first embodiment of the present invention, when the honeycomb structure includes the coating layer, the ratio of the specific surface area of the honeycomb unit to the specific surface area of the coating layer is preferably approximately 1.3 or greater and approximately 20 or less, more preferably approximately 3 or greater and approximately 7 or less. When the ratio of the specific surface area of the honeycomb unit to the specific surface area of the coating layer is preferably approximately 1.3 or greater and approximately 20 or less, the quantity of wind erosion of the coating layer is small. Herein, the quantity of wind erosion of the coating layer is a quantity of damage of the coating layer such as erosion or corrosion of the coating layer which is caused by gas passing through the honeycomb structure.

When the ratio of the specific surface area of the honeycomb unit to the specific surface area of the coating layer is less than approximately 1.3, gas easily penetrates the inside of the coating layer since the specific surface area of the coating layer is relatively high, that is, the porosity of the coating layer is relatively high. Therefore, the coating layer may be easily subjected to deterioration cause by the gas penetrating the inside of the coating layer and the durability of the coating layer may be lowered.

On the other hand, when the ratio of the specific surface area of the honeycomb unit to the specific surface area of the coating layer is greater than approximately 20, a crack may generate in the honeycomb unit at the time of converting gas using the honeycomb unit. Also, the coasting layer may peel from the honeycomb unit. Then, once a crack generates in the honeycomb structure or the coating layer peels from the honeycomb unit, reaction between the coating layer and the gas passing through the honeycomb structure is accelerated and the coating layer is easily deteriorated.

On the other hand, when the ratio of the specific surface area of the honeycomb unit to the specific surface area of the coating layer is preferably approximately 1.3 or greater and approximately 20 or less, the penetration of gas into the coating layer is suppressed and the generation of a crack in the coating layer and the peeling of the coating layer are suppressed, so that the honeycomb structure exhibits a good durability for a long time.

Thus, when the ratio of the specific surface area of the honeycomb unit to the specific surface area of the coating layer is preferably approximately 1.3 or greater and approximately 20 or less, a honeycomb structure with a higher durability against gas passing through the honeycomb structure can be provided.

In the first embodiment of the present invention, preferably, the specific surface area of at least one of the adhesive layer and the coating layer is approximately 10 $m^2/g$ or greater and approximately 100 $m^2/g$ or less. When the specific surface area of at least one of the adhesive layer and the coating layer is approximately 10 $m^2/g$ or greater and approximately 100 $m^2/g$ or less, the quantity of gas passing through at least one of the adhesive layer and the coating layer relative to the specific surface area or porosity of at least one of the adhesive layer and the coating layer is suppressed. Therefore, gas can be selectively passed through the honeycomb unit more than at least one of the adhesive layer and the coating layer. Consequently, a honeycomb structure can be provided which can convert gas more efficiently.

Additionally, in the first embodiment of the present invention, when the honeycomb structure includes the adhesive layer, the specific surface area of the adhesive layer is preferably approximately 10 $m^2/g$ or greater and approximately 100 $m^2/g$ or less. In this case, the quantity of gas passing through the adhesive layer relative to the specific surface area or porosity of the adhesive layer is suppressed. Therefore, gas can be selectively passed through the honeycomb unit more than the adhesive layer. As a result, a honeycomb unit can be provided which can convert gas more efficiently.

Further, the specific surface area of the adhesive layer is approximately 10 $m^2/g$ or greater and approximately 100 $m^2/g$ or less, the adhesive property of the plural honeycomb units can be improved and a honeycomb structure having plural honeycomb units with a good adhesive property can be provided. When the surface area of the adhesive layer is less than approximately 10 $m^2/g$, the relaxation of the honeycomb structure against the thermal stress generated in the honeycomb structure at the time of raising the temperature of the honeycomb structure may be insufficient so that the peeling on an interface between the honeycomb unit and the adhesive layer may be caused. On the other hand, when the specific surface area of the adhesive layer is greater than approximately 100 $m^2/g$, the surface area of the interface (contact area) between the honeycomb unit and the adhesive layer is small and the adhesive property of the plural honeycomb units adhered by the adhesive layer may be insufficient.

In the first embodiment of the present invention, preferably, at least one of the adhesive layer and the coating layer contains at least one of an inorganic particle and an inorganic fiber.

When at least one of the adhesive layer and the coating layer contains at least one of an inorganic particle and an inorganic fiber, the specific surface area of at least one of the adhesive layer and the coating layer can be more easily adjusted. The specific surface area of at least one of the adhesive layer and the coating layer depends on the kind of at least one of the inorganic particle and the inorganic fiber contained in at least one of the adhesive layer and the coating layer. At least one of the adhesive layer and the coating layer may contain an inorganic binder for fixing at least one of the inorganic particle and the inorganic fiber in at least one of the adhesive layer and the coating layer. Further, At least one of the adhesive layer and the coating layer may contain an organic binder for fixing at least one of the inorganic particle and the inorganic fiber in at least one of the adhesive layer and the coating layer.

The inorganic particle is not particularly limited and, for example, an oxide, a carbide, and a nitride can be provided. Specifically, inorganic powder made of silicon carbide, silicon nitride, or boron nitride can be provided. These may be used singularly and two or more kinds thereof may be used in combination. Among the inorganic particles, silicon carbide excellent in the thermal conductivity is desirable.

The inorganic fiber is not particularly limited and, there can be provided ceramic fibers made of, for example, alumina, silica, silica-alumina, glass, potassium titanate, aluminum borate, etc., and, whiskers made of, for example, alumina, silica, zirconia, titania, ceria, mullite, silicon carbide, etc. Among the inorganic fibers, an alumina fiber is desirable.

The inorganic binder is not particularly limited and, for example, an inorganic binder selected from the group including silica sol, alumina sol, and a mixture thereof can be provided. Among these inorganic binders, silica sol is desirable.

The organic binder is not particularly limited and, for example, an organic binder selected from the group including polyvinyl alcohol, methylcellulose, ethylcellulose, carboxymethylcellulose, and combinations thereof can be provided.

In the first embodiment of the present invention, preferably, the honeycomb unit contains a ceramic. When the honeycomb unit contains a ceramic, a honeycomb unit with comparatively high heat resistance, and therefore, a honeycomb structure with comparatively high heat resistance can be provided.

The material of the honeycomb unit is not particularly limited but is preferably a ceramic, and there can be provided, for example, nitride ceramics such as aluminum nitride, silicon nitride, boron nitride, and titanium nitride, carbide ceramics such as silicon carbide, zirconium carbide, titanium carbide, tantalum carbide, and tungsten carbide, and oxide ceramics such as alumina, zirconia, cordierite, and mullite. Also, a silicon-containing ceramic in which metal silicon is compounded in the aforementioned ceramic and a ceramic adhered by at least one of silicon and silicate compounds can be used. Among these ceramics, silicon carbide-based ceramics with a good heat resistance, a good mechanical property and a comparatively high thermal conductivity is desirable. Additionally, the silicon carbide-based ceramics include a ceramic based on silicon carbide in which the silicon carbide is adhered by at least one of metals, crystalline compounds, and amorphous compounds, as well as a ceramic composed of only silicon carbide.

In the first embodiment of the present invention, preferably, the ceramic contains alumina. When the ceramic of the honeycomb unit contains alumina, a honeycomb unit with a higher heat resistance can be obtained since alumina has a comparatively high heat resistance. Therefore, in this case, a honeycomb structure with a higher heat resistance can be provided.

In the first embodiment of the present invention, preferably, the ceramic contains silicon carbide. When the ceramic of the honeycomb unit contains silicon carbide, a honeycomb unit with a good heat resistance, a good mechanical property, and a comparatively high thermal conductivity can be obtained since silicon carbide has a good heat resistance, a good mechanical property, and a comparatively high thermal conductivity. Therefore, in this case, a honeycomb structure with a good heat resistance, a good mechanical property, and a comparatively high thermal conductivity can be provided.

The application of the honeycomb structure in the first embodiment of the present invention is not particularly limited and, for example, there can be provided a carrier for carrying a catalyst such as a catalyst for converting exhaust gas from an internal combustion engine of a vehicle, and a diesel particulate filter (DPF) for filtering and firing a particulate material (PM) contained in exhaust gas from an internal combustion engine of a vehicle.

In the first embodiment of the present invention, preferably, the honeycomb structure further includes a catalyst for reaction of converting gas. When the honeycomb structure further includes a catalyst for reaction of converting gas, a honeycomb structure capable of converting gas more efficiently can be provided, since the reaction of converting gas can be accelerated by the catalyst.

The catalyst contained in or carried on the honeycomb structure is not particularly limited and, for example, a noble metal, a compound of an alkali metal, a compound of an alkali-earth metal, and an oxide can be provided. As a noble metal, for example, a metal selected from the group including platinum, palladium, rhodium, and combinations thereof can be provided. As a compound of an alkali metal, for example, a compound selected from the group including potassium, sodium, and combinations thereof can be provided. As a compound of an alkali-earth metal, for example, a compound of barium can be provided and as an oxide, for example, a perovskite-type compound (for example, $La_{0.75}K_{0.25}MnO_3$) and $CeO_2$ can be provided.

Also, in this case, the honeycomb unit can be used as a catalyst carrier for carrying a catalyst for reaction of converting gas, and a honeycomb structure with a catalyst for reaction of converting gas can be used as a catalyst for converting gas such as an exhaust gas converting catalyst (a three-way catalyst, a NOx occluding catalsyt) for converting exhaust gas ejected from an internal combustion engine of a vehicle such as an automobile.

The second embodiment of the present invention is a gas converting apparatus for converting gas which includes a honeycomb structure being the first embodiment of the present invention.

According to the second embodiment of the present invention, a gas converting apparatus that includes a honeycomb structure capable of converting gas more efficiently can be provided, since the honeycomb structure being the first embodiment of the present invention is included.

As a gas converting apparatus for converting gas, for example, an exhaust gas converting apparatus for a vehicle, for converting exhaust gas ejected from an internal combustion engine of a vehicle such as an automobile can be provided.

Figure 1:
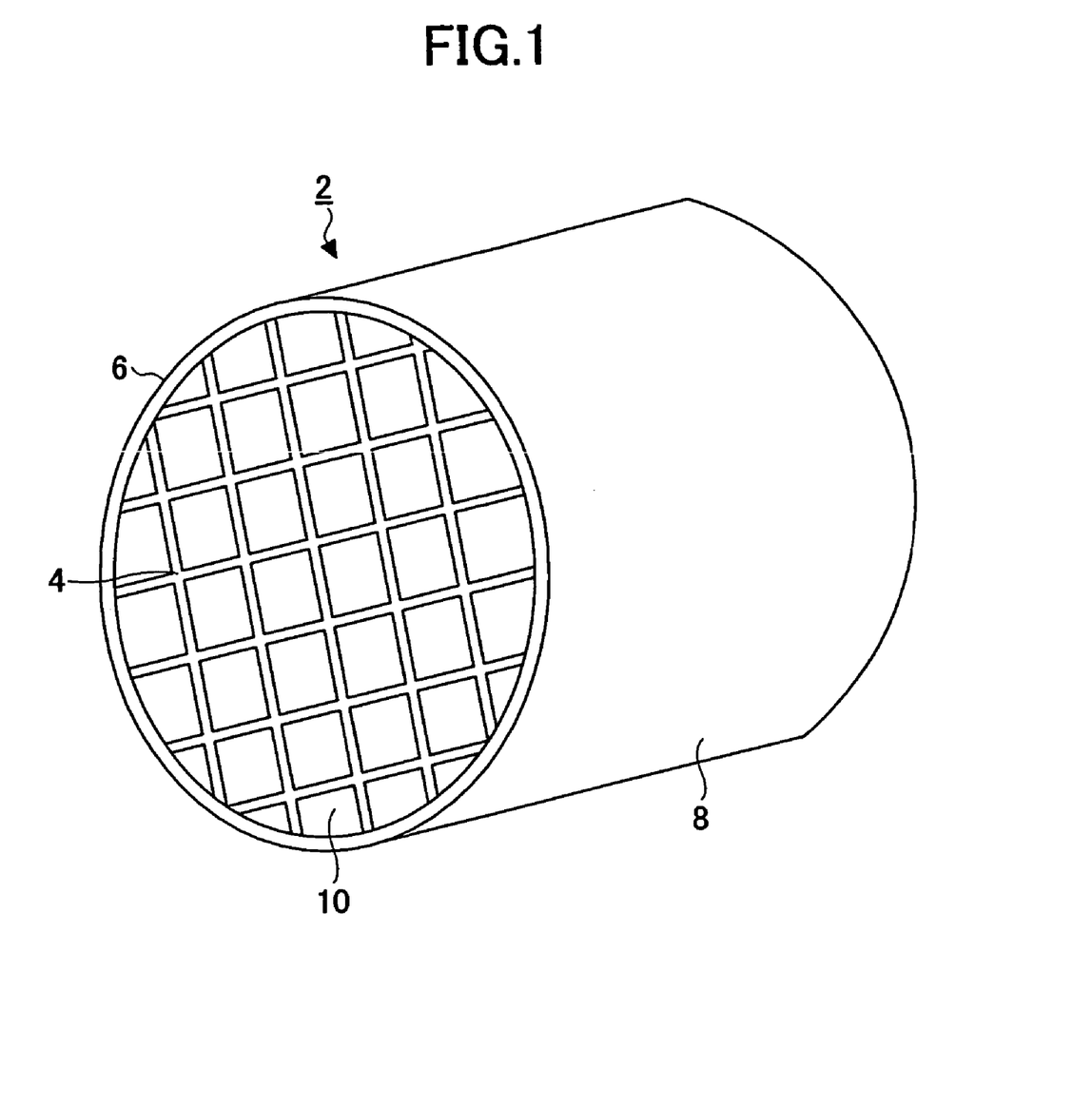
FIG. 1 is a diagram illustrating an example of a honeycomb structure according to the present invention.

FIG. 1 is a diagram illustrating an example of a honeycomb structure according to the present invention.

A honeycomb structure 2 according to the present invention as shown in FIG. 1 is used as an exhaust gas converting catalyst for converting exhaust gas from an internal combustion engine of an automobile and includes plural honeycomb units 10, an adhesive layer 4 for adhering the plural honeycomb units 10, and a coating layer 6 for coating a peripheral portion 8 of the honeycomb structure 2. More specifically, the plural honeycomb units 10 are adhered through the intermediary of the adhesive layer 4 in the honeycomb structure 2. The coating layer 6, more particularly, coats at least one peripheral portion of at least one of the plural honeycomb units 10 and can reinforce the honeycomb structure 2.

In the honeycomb structure 2, the ratio of the specific surface area of the honeycomb unit 10 to the specific area of the adhesive layer 4 is approximately 1.0 or greater and the ratio of the specific surface area of the honeycomb unit 10 to the specific area of the coating layer 6 is approximately 1.0 or greater. Accordingly, the honeycomb structure 2 can convert exhaust gas from an internal combustion engine of an automobile more efficiently.

Also, the specific surface area of the adhesive layer 4 is approximately 10 $m^2/g$ or greater and approximately 100 $m^2/g$ or less, so that the adhesive property of the plural honeycomb units 10 can be improved. Further, the adhesive layer 4 contains at least one of an inorganic particle or an inorganic fiber, so that the specific surface area of the adhesive layer 4 can be adjusted more easily.

Figure 2:
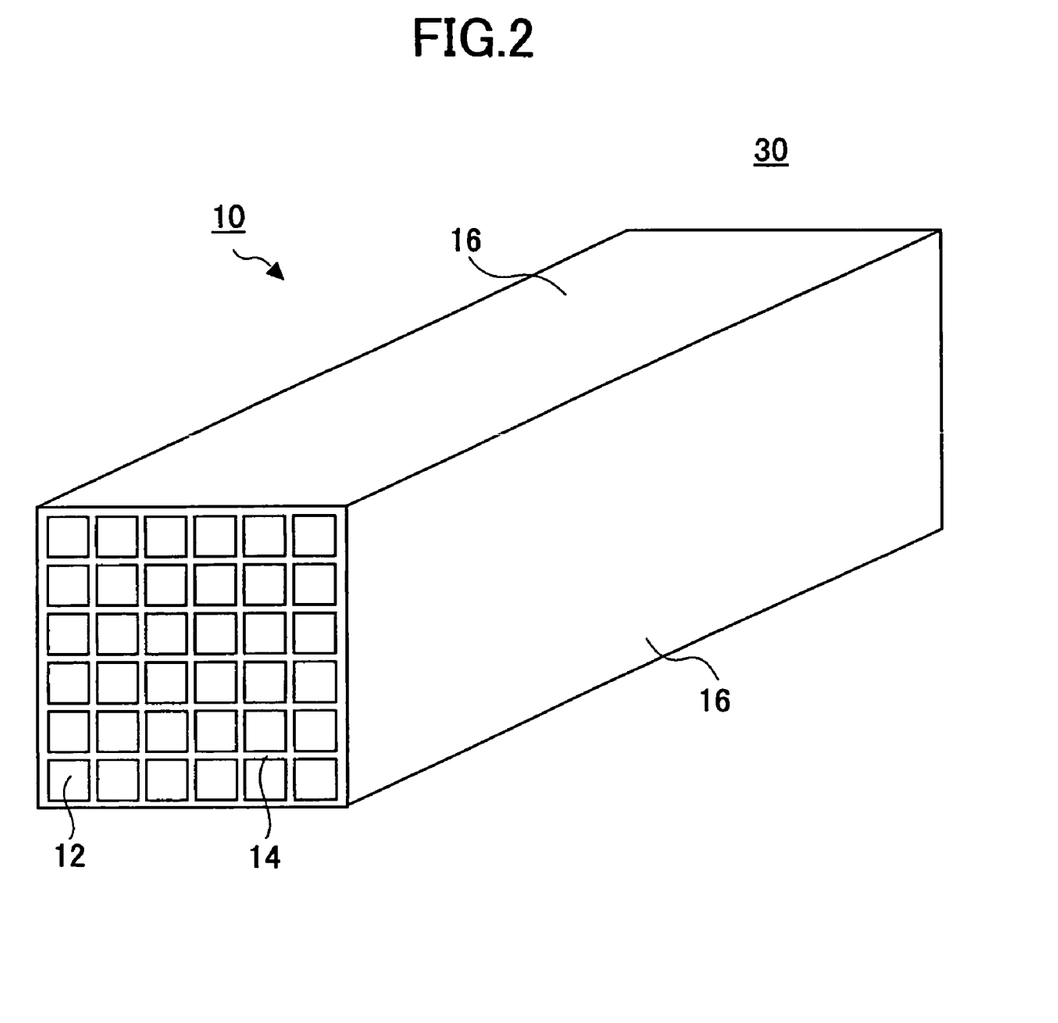
FIG. 2 is a diagram illustrating an example of a honeycomb unit of a honeycomb structure according to the present invention.

FIG. 2 is a diagram illustrating an example of a honeycomb unit of a honeycomb structure according to the present invention.

A honeycomb unit 10 as shown in FIG. 2 is separated by a cell wall 14 and has plural cells 12 that extend in the longitudinal direction of a honeycomb structure 2. In other words, in the honeycomb unit 10, the plural cells 12 are separated by the cell wall 14 and juxtaposed in the longitudinal direction. That is, the cell wall 14 is provided among the plural cells 12 that extend in the longitudinal direction of the honeycomb structure 12 and the plural cells 12 are arranged in a direction perpendicular to a direction in which the cells extend. The adhesive layer 4 as shown in FIG. 1 is provided on a peripheral portion 16 of the honeycomb unit 10. The exhaust gas passes through the plural cells 12 and is converted by the plural cells 12.

The honeycomb unit 10 contains a ceramic such as alumina and silicon carbide. Therefore, the honeycomb structure 2 has a comparatively high heat resistance.

Figure 3:
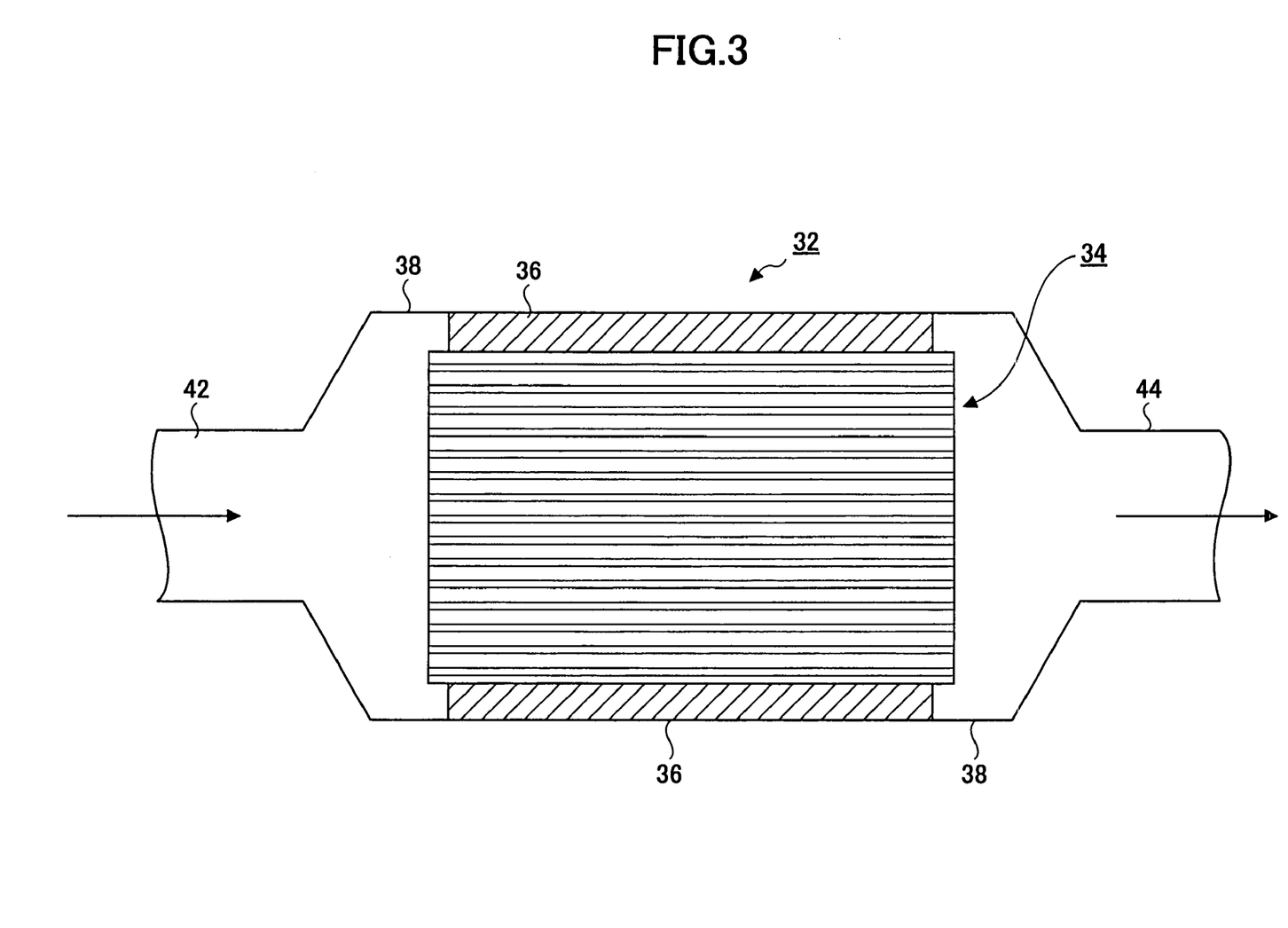
FIG. 3 is a diagram illustrating an example of a gas converting apparatus according to the present invention.

FIG. 3 is a diagram illustrating an example of a gas converting apparatus according to the present invention.

A gas converting apparatus as shown in FIG. 3 is an exhaust gas converting apparatus 32 for converting exhaust gas from an internal combustion engine such as an engine of an automobile. The exhaust gas converting apparatus 32 includes an exhaust gas converting catalyst 34 that includes an honeycomb structure 2 as shown in FIG. 1 and FIG. 2, a casing 38 for covering the outer side of the exhaust gas converting catalyst 34, and a gas tightness keeping member 36 provided between the exhaust gas converting catalyst 34 and the casing 38. An introduction pipe 42 that is coupled with an internal combustion engine such as an engine of an automobile is connected to one end of the casing 38 at the side of exhaust gas introduction and an ejection pipe 44 that is joined to the exterior is connected to the opposite end of the casing 38. Additionally, arrows in FIG. 3 indicate exhaust gas flow in the exhaust gas converting apparatus 32.

In the exhaust gas converting apparatus 32 with such a configuration, exhaust gas ejected from an internal combustion engine such as an engine of an automobile passes through the introduction pipe 42, is introduced into the casing 38, passes through the inside of the exhaust gas converting catalyst 34, and is ejected to the exterior through the ejection pipe 44. In the honeycomb structure included in the exhaust gas converting catalyst 34, the exhaust gas flows into the cell of the honeycomb unit from the side of exhaust gas introduction, passes through the cell of the honeycomb unit, and ejected from the side of exhaust gas ejection. Then, when the exhaust gas passes through the cell of the honeycomb unit, particles contained in the exhaust gas are trapped on a cell wall of the honeycomb unit and the exhaust gas is purified.

Also, in the exhaust gas converting apparatus 32, when a large number of particles are deposited on the cell wall of the honeycomb structure included in the exhaust gas converting catalyst 34 and pressure loss in the exhaust gas converting catalyst 34 becomes high, a regeneration treatment for the exhaust gas converting catalyst 34 is performed. For the regeneration treatment for the exhaust gas converting catalyst 34, heated gas flows into the inside of the cell of the honeycomb structure included in the exhaust gas converting catalyst 34. Thus, the particles deposited on the cell wall of the honeycomb structure are fired and eliminated by heating the exhaust gas converting catalyst 34.

Next, an example of a method for manufacturing a honeycomb structure according to the present invention is described.

A honeycomb unit can be manufactured through each process of mixing, kneading, molding and firing raw materials composed of the aforementioned materials using the conventional techniques. The specific surface area of the honeycomb unit can be controlled by, for example, changing the average particle diameter of particle-like raw materials or changing the thickness of a layer for carrying a catalyst (for example, an alumina layer) formed on the cell wall of the honeycomb unit.

Then, paste for adhesive layer which contains raw materials composed of the aforementioned materials is applied on the peripheral portion of the obtained honeycomb unit and the plural honeycomb units (38 honeycomb units in FIG. 1) are temporally adhered. Then, the temporally adhered plural honeycomb units are dried and the plural honeycomb units are adhered.

In order to make the ratio of the specific surface area of the honeycomb unit to the specific surface area of the adhesive layer be approximately 1.0 or greater in a finally completed honeycomb structure, the specific surface area of the adhesive layer is adjusted, for example, by controlling the particle size of the particle-like raw materials contained in the paste for adhesive layer and the compounding ratio of the raw materials or by controlling temperature and time for drying the paste for adhesive layer. Although the temperature and time for drying the paste for adhesive layer can vary depending on the design value of the specific surface area of the adhesive layer, the drying of the paste for adhesive layer is commonly performed at temperature within a range of approximately 400° C. through approximately 800° C. for approximately 1 hour through approximately 2 hours.

Additionally, in order to make the specific surface area of the adhesive layer be a value within a range of approximately 10 $m^2/g$ or greater and approximately 100 $m^2/g$ or less, for example, after pastes 2 through 6 are prepared using raw materials for pastes 2 through 6 shown in Table 1 for a practical example described below at compounding ratios of the raw materials which ratios are shown in Table 1, the adhesion treatment as described above is performed.

In order to adjust the shape of the honeycomb structure after the adhesion, the adhered plural honeycomb units may be cut or polished according to need. In the honeycomb structure shown in FIG. 1, the adhered plural honeycomb units are cut into a cylindrical shape using a diamond cutter.

Then, paste for coating layer is applied on a peripheral portion of the adhered plural honeycomb units and the paste for coating layer is dried, whereby a coating layer is formed on the peripheral portion of the adhered honeycomb units.

In order to make the ratio of the specific surface area of the honeycomb unit to the specific surface area of the coating layer be approximately 1.0 or greater in a finally completed honeycomb structure, the specific surface area of the coating layer is adjusted, for example, by controlling the particle size of particle-like raw materials contained in the paste for coating layer and the compounding ratio of the raw materials or by controlling temperature and time for drying the paste for coating layer, similar to the method for forming the adhesive layer. Although the temperature and time for drying the paste for coating layer can vary depending on a design value of the specific surface area of the coating layer, the drying of the paste for coating layer is commonly performed at temperature within a range of approximately 400° C. through approximately 800° C. for approximately 1 hour through approximately 2 hours.

PRACTICAL EXAMPLE

Manufacture of Paste for Adhesive Layer

Seven kinds of pastes for adhesive layer were manufactured which pastes can be composed of silicon carbide powder (with an average particle diameter of 0.6 μm) as the first inorganic particles, γ-alumina particles (with an average particle diameter of 0.5 μm) as the second inorganic particles, silica-alumina fibers (with an average fiber diameter of 10 μm) as inorganic fibers, silica sol as an inorganic binder, carboxymethylcellulose and water at compounding ratios shown in Table 1.

TABLE 1

|  | Paste 1 | Paste 2 | Paste 3 | Paste 4 | Paste 5 | Paste 6 | Paste 7 |
|---|---|---|---|---|---|---|---|
| Silicon carbide (weight %) | 20 | 20 | 10 | 5 | 0 | 0 | 0 |
| γ-alumina (weight %) | 0 | 10 | 20 | 25 | 30 | 35 | 35 |
| Silica-alumina fiber (weight %) | 30 | 7 | 7 | 7 | 7 | 2 | 0 |
| Silica sol Solid content: 30 weight % | 16 | 33 | 33 | 33 | 33 | 33 | 35 |
| Carboxylmethyl cellulose (weight %) | 5.6 | 5.0 | 5.0 | 5.0 | 5.0 | 5.0 | 5.0 |
| Water (weight %) | 28.4 | 25.0 | 25.0 | 25.0 | 25.0 | 25.0 | 25.0 |
| Specific surface area (m$^2$/g) | 5 | 10 | 25 | 50 | 75 | 100 | 150 |

The specific surface areas of adhesive layers from the pastes for adhesive layer were measured as follows. Each of the pasted for adhesive layer was dried at 150° C. for 2 hours and subsequently subjected to heat treatment at 500° C., and the pastes for adhesive layer were solidified. The solidified pastes for adhesive layer were cut into cubes with a side length of 15 mm which were samples for adhesive layer. Additionally, the condition of manufacturing the samples for adhesive layer was the same as a condition of adhesion between honeycomb units and the adhesive layer which is described below. Next, the specific surface areas of the samples for adhesive layer were measured by a single point method in accordance with JIS-R-1626 (1996) defined by Japanese Industrial Standards using a BET measuring apparatus (Micromeritics Flowsorb II-2300 produced by SHIMADZU CORPORATION). Additionally, the entire contents of JIS-R-1626 (1996) are hereby incorporated by reference. The measurement results of the specific surface areas of the samples for adhesive layer are shown in Table 1.

[Manufacture of Honeycomb Structure]

As honeycomb structures, a silicon carbide-based honeycomb structure and an alumina-based honeycomb structure were manufactured.

(1) Manufacture of a Silicon Carbide-based Honeycomb Structure (Manufacture of Silicon Carbide-based Honeycomb Unit)

Raw material powder was obtained by mixing 80% by weight of silicon carbide powder with an average particle diameter of 8.5 μm and 20% by weight of silicon carbide powder with an average particle diameter of 0.2 μm.

Then, 10 parts by weight of methylcellulose as a molding assistant agent were mixed into 100 parts by weight of the raw material powder. Also, 18 parts by weight of a dispersion medium made from an organic solvent and water was added and all the raw materials were kneaded. A honeycomb molded object with a desired shape was obtained by means of extrusion molding of the kneaded raw materials. The molded object was dried at 150° C., degreased at 500° C., and subsequently fired at 2200° C. under inert atmosphere, so that a honeycomb unit with a size of 34.3 mm×34.3 mm×150 mm was obtained.

(Formation of Catalyst Carrying Layer)

Next, γ-alumina, water, and nitric acid were mixed and γ-alumina contained in the obtained solution of nitric acid was further milled using a ball mill, so that alumina slurry with an average particle diameter of 2 μm was manufactured. The honeycomb unit was dipped into the obtained alumina slurry and the honeycomb unit with the alumina slurry was dried at 200° C. Such dipping and drying processes were repeated until the mass of an alumina layer adhering to a unit volume of the honeycomb unit was 3 g/L through 140 g/L, and the honeycomb unit provided with the alumina layer was fired at 600° C. Thus, alumina was carried on a surface of the cell wall of the honeycomb unit, and honeycomb units with specific surface area different from each other were manufactured.

The obtained honeycomb units were cut into cylinder-shaped small pieces (15 mmφ×15 mm) so as to obtain samples of the honeycomb units. The specific surface areas of the obtained honeycomb units were measured using the aforementioned method.

(Manufacture of Honeycomb Unit with Catalyst)

Next, a solution of dinitroammineplatinum acetate with a platinum concentration of 4.53% by weight was diluted with distilled water. The diluted solution was impregnated into the alumina layer carried on the samples of honeycomb unit. The samples of honeycomb with an alumina layer in which the solution was impregnated were kept at 110° C. for 2 hours and further heated at 500° C. for 1 hour under nitrogen atmosphere so as to obtain the samples of honeycomb unit on which a platinum catalyst was carried.

(Formation of Adhesive Layer)

Next, the paste for adhesive layer described above was applied on an adhesive surface of the honeycomb unit having the obtained platinum catalyst. The samples of plural honeycomb units on which the paste for adhesive layer had been applied were dried at 150° C. for 2 hours and fired at 500° C. so as to adhere the plural honeycomb units. Then, the adhered honeycomb units were cut using a diamond cutter so as to form a cylinder-shaped honeycomb structure. The thickness of the adhesive layer was 2 mm.

(Formation of Coating Layer)

Further, for a honeycomb structure having a coating layer, after the paste for adhesive layer was dried and before the sample of plural honeycomb units on which the paste for adhesive layer had been applied was fired, the same paste for adhesive layer was also applied on the peripheral portion of the sample of plural honeycomb units on which the paste for adhesive layer had been applied. Then, the sample of plural honeycomb units with the peripheral portion on which the paste for adhesive layer had been applied was dried at 150° C. for 2 hours and fired at 500° C. That is, while the adhesive layer was formed on the sample of plural honeycomb units, a coating layer was formed on the peripheral portion of the sample of plural honeycomb units. The thickness of the coating layer was 2 mm.

(2) Manufacture of Alumina-based Honeycomb Structure (Manufacture of Alumina-Based Honeycomb Structure)

40% by weight of γ-alumina particles with an average particle diameter of 2 μm through 20 μm, 10% by weight of silica-alumina fibers (with an average fiber diameter of 10 μm), and 50% by weight of silica sol were mixed. 6 parts by weight of methylcellulose as an organic binder, a small amount of plasticizer, and a small amount of lubricant were mixed into 100 parts by weight of the obtained mixture and the mixture was kneaded so as to obtain a kneaded composition. The kneaded composition was extrusion-molded using an extrusion-molding machine so as to obtain a molded object.

The obtained molded object was dried using a microwave dryer and a hot air dryer and degreased by keeping it at 400° C. for 2 hours. Afterward, the degreased molded object was fired at 800° C. for 2 hours so that square-pillar-shaped (34.3 mm×34.3 mm×150 mm) alumina-based honeycomb units with specific surface areas different from each other were obtained.

The obtained honeycomb unit was cut into cylinder-shaped small pieces (15 mmφ×15 mm) so as to obtain the sample of honeycomb unit. The specific surface area of the obtained honeycomb unit was measured using the aforementioned method.

(Formation of Adhesive Layer)

Next, the paste for adhesive layer described above was applied on an adhesive surface of the honeycomb unit having the obtained platinum catalyst. The samples of plural honeycomb units on which the paste for adhesive layer had been applied were dried at 150° C. for 2 hours and fired at 500° C. so as to adhere the plural honeycomb units. Then, the adhered honeycomb units were cut using a diamond cutter so as to form a cylinder-shaped honeycomb structure. The thickness of the adhesive layer was 2 mm.

(Formation of Coating Layer)

Further, for a honeycomb structure having a coating layer, after the paste for adhesive layer was dried and before the sample of plural honeycomb units on which the paste for adhesive layer had been applied was fired, the same paste for adhesive layer was also applied on the peripheral portion of the sample of plural honeycomb units on which the paste for adhesive layer had been applied. Then, the sample of plural honeycomb units with the peripheral portion on which the paste for adhesive layer had been applied was dried at 150° C. for 2 hours and fired at 500° C. That is, while the adhesive layer was formed on the sample of plural honeycomb units, a coating layer was formed on the peripheral portion of the sample of plural honeycomb units. The thickness of the coating layer was 2 mm.

[Evaluation of Honeycomb Structures]

(1) Measurement of Light-off Temperatures

The light-off temperatures of the honeycomb structures manufactured as described above were measured.

Figure 4:
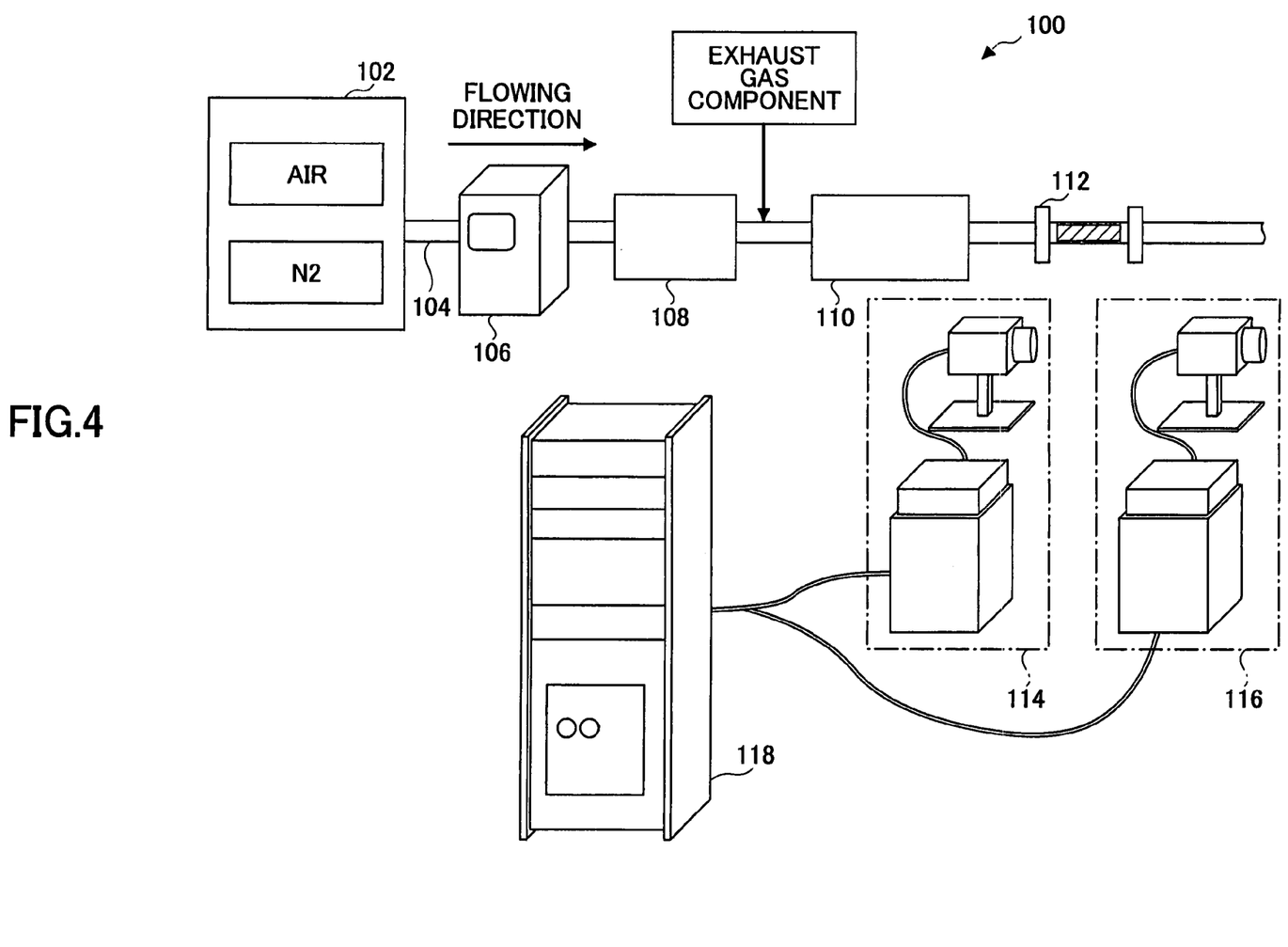
FIG. 4 is a diagram illustrating an apparatus for measuring the light-off temperature of a honeycomb structure.

FIG. 4 is a diagram illustrating an apparatus for measuring the light-off temperature of a honeycomb structure. The light-off temperature of the honeycomb structure was measured, for example, using a light-off temperature measuring apparatus 100 shown in FIG. 4. The light-off temperature measuring apparatus 100 has a diluted gas feeding part 102 for feeding diluted gas for which nitrogen is diluted with air, a flowing path 104 for flowing the diluted gas to the honeycomb structure, a humidifier 106 for humidifying the diluted gas, a heater 108 for heating the diluted gas, a gas mixer 110 for mixing an exhaust gas component into the heated diluted gas so as to prepare reactive gas, a sample holder 112 for keeping the honeycomb unit being on gas-tight condition, an entrance gas sampler 114 for sampling the reactive gas before contacting the honeycomb structure, an exit gas sampler 116 for sampling reacted gas after contacting the honeycomb structure, and a gas analyzer 118 for analyzing the concentration of a particular gas component contained in the reacted gas.

First, the honeycomb structure obtained above was set on the sample holder 112 and diluted gas that contained air and nitrogen from the diluted gas feeding part 102 was flown in the flowing path 104 at a predetermined flow rate. Then, the diluted gas was humidified using the humidifier 106 and the temperature of the diluted gas was adjusted to a predetermined temperature using the heater 108. Continuously, an exhaust gas component from the upstream side of the gas mixer 110 was injected into the flowing diluted gas and the diluted gas and the exhaust gas component were mixed using the gas mixer 110 so as to prepare reactive gas with a predetermined concentration. Then, the prepared reactive gas was flown into the honeycomb unit so as to convert the reactive gas. At this time, the temperature of the heater 108 was appropriately changed and the temperature of the reactive gas inside the honeycomb structure at each temperature of the heater 108 was measured by a thermocouple that is not shown in the figure. Also, the concentration of the exhaust gas component in the reactive gas that was sampled using the entrance gas sampler 114 and the exit gas sampler 116 was measured by the gas analyzer 118.

The flow rate of the reactive gas was 131 (L/minute). The exhaust gas component was composed of oxygen, carbon monoxide, sulfur dioxide, hydrocarbons, nitrogen monoxide, water vapor, and nitrogen. The concentration of the oxygen in the reactive gas was 13%, the concentration of the carbon monoxide was 300 ppm, the concentration of the sulfur dioxide was 8 ppm, the concentration of the hydrocarbons based on carbon quantity was 200 ppm-C, the concentration of the nitrogen monoxide was 160 ppm, and the quantity of additional moisture was a certain quantity. Also, the temperature of the reactive gas was changed at 10° C. of the temperature of the heater 108 and was 50° C. through 400° C. Then, the concentrations of the carbon monoxide and the hydrocarbons among the exhaust gas components contained in the reactive gas were measured using the gas analyzer 218. A conversion rate of the reactive gas was defined by the formula:

Conversion rate (%)=($C0-Ci$)/$C0$×100, wherein $C0$ is the concentration of an exhaust gas component before the reactive gas contacts the honeycomb structure and $Ci$ is the concentration of an reacted gas component after the reactive gas contacts the honeycomb structure.

Further, temperature at which the conversion rate of the reactive gas was 50% was defined as a light-off temperature (° C.).

Figure 5:
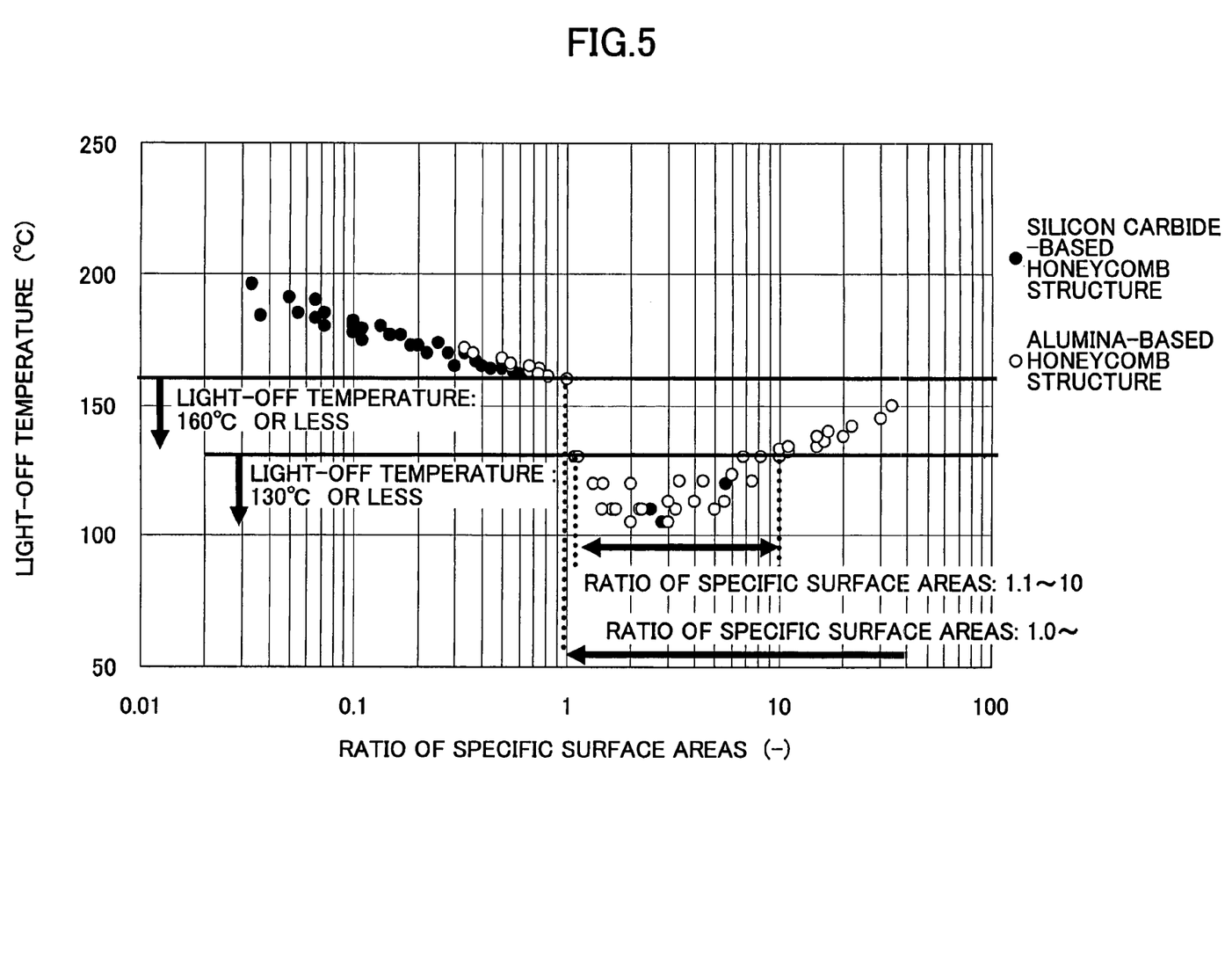
FIG. 5 is a diagram showing measurement results of the light-off temperature of honeycomb structures.

FIG. 5 is a diagram showing measurement results of the light-off temperature of honeycomb structures. The horizontal axis in FIG. 5 represents the ratio of the specific surface area of the honeycomb unit to the specific surface area of the adhesive layer and the vertical axis in FIG. 5 represents the light-off temperature of the honeycomb structure. Commonly, when the light-off temperature of an exhaust gas conversion catalyst is 160° C. through 170° C. or less, the performance of the exhaust gas converting catalyst is regarded as well. As shown in FIG. 5, it is understood that the light-off temperatures of the honeycomb structures are 160° C. or less and the honeycomb structures exhibit a good conversion performance when the ratio of the specific surface area of the honeycomb unit to the specific surface area of the adhesive layer is 1.0 or greater. Particularly, it is understood that the light-off temperatures of the honeycomb structures are 130° C. or less and the honeycomb structures exhibit a particularly good conversion performance when the ratio of the specific surface area of the honeycomb unit to the specific surface area of the adhesive layer is 1.1 or greater and 10 or less.

(2) Adhesion Test for Honeycomb Structures

An adhesion test for honeycomb structures with an adhesive layer with a specific surface area of 5 $m^2$/g through 150 $m^2$/g was performed. First, after the honeycomb structure that had been previously kept at 900° C. for 20 hours was cooled to room temperature, the honeycomb structure was fixed in a hollow and cylindrical jig. Next, one honeycomb unit near the center of the honeycomb structure was selected and the selected honeycomb unit was pushed (punched) by a cylindrical jig made of stainless steel. Then, the value of load (kg) that is necessary for pushing (punching) the honeycomb unit by the cylindrical jig made of stainless steel was measured.

The value of load was referred to as the adhesion strength of the adhesive layer. Additionally, the ratio of the specific surface area of the honeycomb unit to the specific surface area of the adhesive layer was within a range of 1.1 or greater and 3 or less. The results of the adhesion strengths of the obtained adhesive layers are shown in Table 2.

TABLE 2

| Specific surface area of adhesive layer ($m^2/g$) | Adhesion strength (kg) |
|---|---|
| 5.0 | 570 |
| 10.0 | 870 |
| 25.0 | 1025 |
| 50.0 | 920 |
| 75.0 | 840 |
| 100.0 | 650 |
| 150.0 | 550 |

Commonly, a load per a unit surface area of approximately 1.0 kg/cm$^2$ through 3.0 kg/cm$^2$ is applied to a honeycomb structure for converting exhaust gas from a vehicle depending on the vibration of an engine and the pressure of the exhaust gas. As the load is applied on the honeycomb structure described above, the adhesion strength required for the adhesive layer (with a load carrying surface area of 206 cm$^2$) for adhering the honeycomb units (with a size of 34.3 mm×34.3 mm×150 mm) of the honeycomb structure is up to approximately 618 kg.

As shown in FIG. 2, it is understood that when the specific surface area of the adhesive layer is 10 m$^2$/g or greater and 100 m$^2$/g or less, the adhesion strength of the adhesive layer is 618 kg (3 kg/cm$^2$) or greater and the adhesive layer has a sufficient adhesion property which can be actually used even after a load is applied on the honeycomb structure.

When the specific surface area of the-adhesive layer is either 5 m$^2$/g or 150 m$^2$/g, the adhesion strength of the adhesive layer is reduced to approximately 60% of the adhesion strength in the case of a specific surface area of 50 m$^2$/g.

(3) Durability Test for Honeycomb Structure with Coating Layer

A durability test for honeycomb structures with a coating layer was performed.

For the durability test, a diesel engine was driven by 3000 revolutions at a torque of 50 Nm so as to feed exhaust gas into the honeycomb structure and a regeneration treatment for soot generated in the honeycomb structure was performed every 6 hours. The regeneration treatment for soot was a heat treatment for firing the soot generated in the honeycomb structure by setting the honeycomb structure in a furnace set at 720° C., which was performed totally for 600 hours. Then, the difference between the weight of the honeycomb structure before starting the durability test and the weight of the honeycomb structure after the regeneration treatment of all the soot was defined as the maximum quantity of wind erosion (g) of the honeycomb structure.

Figure 6:
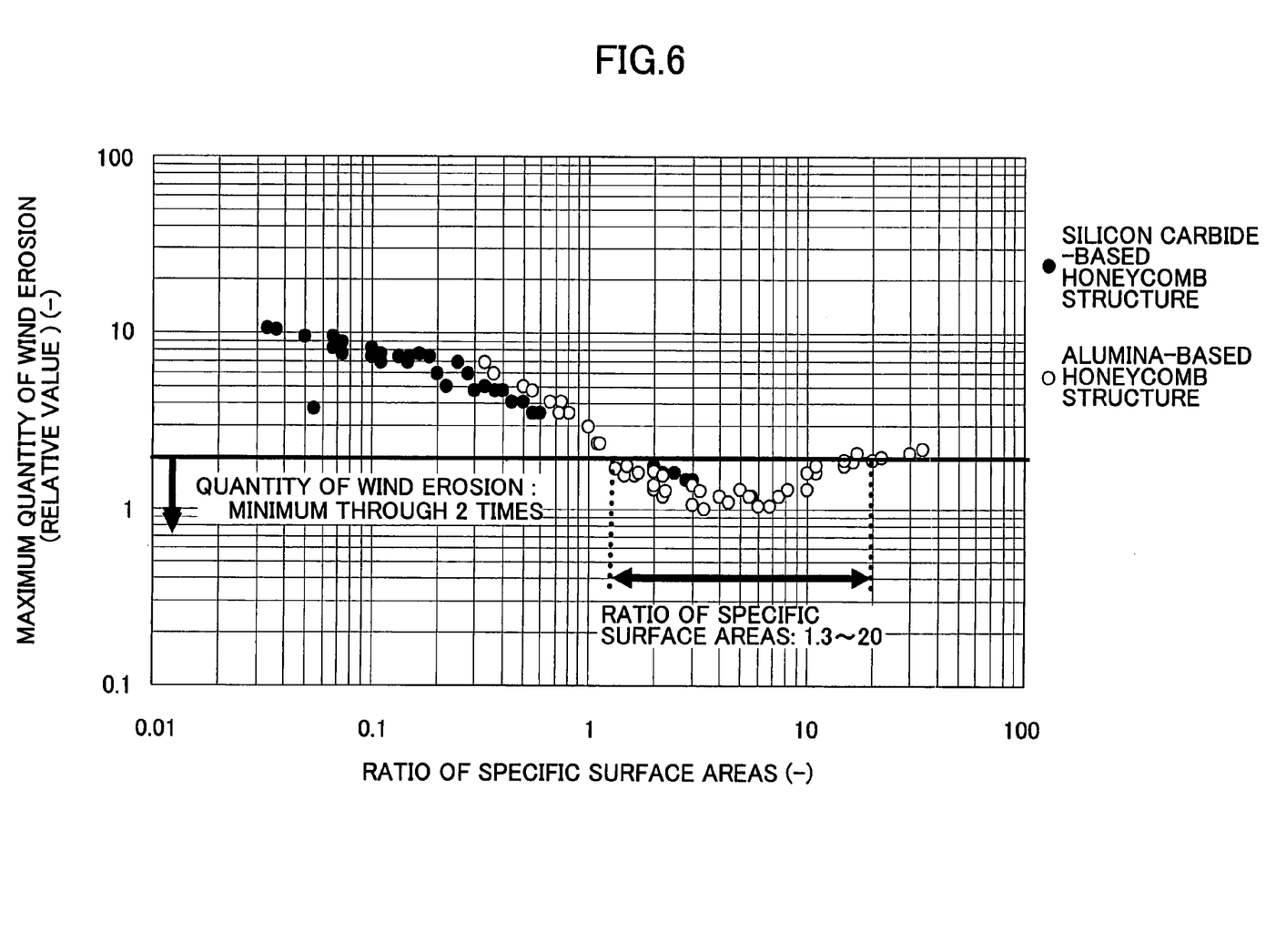
FIG. 6 is a diagram showing the results of a durability test for honeycomb structures with a coating layer.

FIG. 6 is a diagram showing the results of a durability test for honeycomb structures with a coating layer. The horizontal axis in FIG. 6 represents the ratio of the specific surface area of the honeycomb unit to the specific surface area of the coating layer and the vertical axis in FIG. 6 represents the relative value of the maximum quantity of wind erosion generated in the coating layer after the durability test. Herein, the reference of the maximum quantity of wind erosion '1' is the maximum quantity of wind erosion of a honeycomb structure with the least maximum quantity of wind erosion (the alumina-based honeycomb structure in which the ratio of the specific surface area of the honeycomb unit to the specific surface area of the coating layer is 3.4 and the specific surface area of the coating layer is 50 m$^2$/g).

As shown in FIG. 6, it is understood that when the ratio of the specific surface area of the honeycomb unit to the specific surface area of the coating layer is 1.0 or greater, the maximum quantity of wind erosion of the honeycomb structure is relatively small and the durability of the honeycomb structure is relatively high. Particularly, it is understood that when the ratio of the specific surface area of the honeycomb unit to the specific surface area of the coating layer is 1.3 or greater and 20 or less, the maximum quantity of wind erosion of the honeycomb structure is 1 or greater and 2 or less and the durability of the honeycomb structure is particularly well.

Thus, when the ratio of the specific surface area of the honeycomb unit to the specific surface area of the adhesive layer is 1.0 or greater, the exhaust gas converting performance of the honeycomb structure can be improved. Also, when the ratio of the specific surface area of the honeycomb unit to the specific surface area of the coating layer is 1.0 or greater, the durability of the honeycomb structure can be improved.

The present invention is not limited to the specifically disclosed embodiment, and variations and modifications may be made without departing from the scope of the present invention.

This application claims a benefit of priorities based on JP-A-2005-025406 filed on Feb. 1, 2005 and PCT/JP2005/022589 filed on Dec. 8, 2005, the entire contents of which patent applications are hereby incorporated by reference.

What is claimed is:

1. A honeycomb structure, comprising:
   a plurality of honeycomb units bonded through an adhesive layer, each honeycomb unit comprising a plurality of cells placed in parallel in a longitudinal direction of the honeycomb unit, each of the cells separated from an adjacent cell by a cell wall,
   wherein a ratio of a specific surface area of the honeycomb unit to the specific surface area of the adhesive layer is approximately 1.0 or greater.

2. The honeycomb structure as claimed in claim 1, wherein the specific surface area of the adhesive layer is approximately 10 m$^2$/g or greater and approximately 100 m$^2$/g or less.

3. The honeycomb structure as claimed in claim 1, wherein the adhesive layer comprises at least one of an inorganic particle and an inorganic fiber.

4. The honeycomb structure as claimed in claim 1, which comprises a coating layer for coating at least one peripheral portion of at least one of the plurality of honeycomb units, wherein a ratio of a specific surface area of the honeycomb unit to that of the coating layer is approximately 1.0 or greater.

5. The honeycomb structure as claimed in claim 1, wherein the honeycomb unit contains a ceramic material.

6. The honeycomb structure as claimed in claim 5, wherein the ceramic material comprises alumina.

7. The honeycomb structure as claimed in claim 5, wherein the ceramic material comprises silicon carbide.

8. The honeycomb structure as claimed in claim 1, wherein the honeycomb structure carries a catalyst.

* * * * *